United States Patent [19]
Onishi

[11] Patent Number: 5,557,496
[45] Date of Patent: Sep. 17, 1996

[54] RECHARGEABLE ELECTRIC POWER SUPPLY DEVICE

[75] Inventor: Yoshihiro Onishi, Hachioji, Japan

[73] Assignee: World Enterprise Co., Ltd., Tokyo, Japan

[21] Appl. No.: 277,172

[22] Filed: Jul. 19, 1994

[30] Foreign Application Priority Data

Jul. 30, 1993 [JP] Japan .................... 5-227727

[51] Int. Cl.$^6$ .................... H01G 9/022; H01G 9/04; H01G 9/042

[52] U.S. Cl. .................... 361/500; 361/508; 361/516; 361/518; 361/523; 361/528; 361/532; 361/535; 361/536; 310/52; 136/233; 429/199

[58] Field of Search ............... 361/500, 508, 361/516, 518, 523, 528, 532, 535, 536

[56] References Cited

U.S. PATENT DOCUMENTS 3,607,447  9/1971  Davis ........................... 136/233
4,048,404  9/1977  Bro ............................. 429/199

*Primary Examiner*—Leo P. Picard
*Assistant Examiner*—Anthony Dinkins
*Attorney, Agent, or Firm*—Ostrolenk, Faber, Gerb & Soffen

[57] ABSTRACT

A rechargeable electric power supply device comprises a supply unit including a pair of electrodes spaced apart from each other embedded in a mixture of (a) fired fine pellets of an electron absorbing material consisting of $Nb_3Sn$ and $V_3Ge$, (b) fine particles of a mixed electron absorbing material comprising $V_3Ga$, Bi, CuO, Sr and $FeO_2$, (c) fine particles of a catalyst, (d) fine particles of C and $FeO_2$ serving as a stabilizer, and (e) a plasticizer, and a casing for accommodating the pair of electrodes and the mixture therein so that the pair of electrodes are individually in intimate contact with the mixture. The device serves as a kind of capacitor with great charge power and the capability of emitting electrons over a long time.

8 Claims, 4 Drawing Sheets

RECHARGEABLE ELECTRIC POWER SUPPLY DEVICE

BACKGROUND OF THE INVENTION

1. Field of the Invention

This invention relates to an electric power supply device and more particularly, to a rechargeable electric power supply device which is adapted for use in solar modules, such as solar cars, solar boats, solar scooters and the like, along with known lead and like batteries. Because the rechargeable device exhibits good constant current charge and constant voltage charge characteristics, the functions of the solar modules are fully complemented with increasing charge efficiency and utilization efficiency being attained. The rechargeable device has such a great electric capacitance that it is rechargeable like capacitors from the standpoint of its function.

2. Description of the Prior Art

With rechargeable batteries which are employed in known solar modules as having, for example, a rating of DC 12V, the electric generation from the solar module is not enough to charge the battery under rainy or cloudy weather conditions. If the battery is charged at a potential of DC 12V or below, the battery is not charged at all irrespective of how to generate electricity or how to charge. Thus, the generated electricity is discharged only in vain.

Various types of DC charge devices have been heretofore proposed. However, all the devices have complicated structures. Nevertheless, great constant current charge characteristic and constant voltage charge characteristics are not obtained with a low charge efficiency. More particularly, substantially all electric charges pass at one time and disappear at the time of primary discharge, and a charge time is long. When charge and discharge operations are repeated, the solar modules may often suffer damages, resulting in the shortage of life of the module. Thus, the known charge devices are disadvantageous in the complicated structure and also in economy.

SUMMARY OF THE INVENTION

It is an object of the invention to provide a rechargeable electric power supply device which overcomes the disadvantages of the prior art counterparts and which has great charge power, enabling electrons to emit over a prolonged time.

It is another object of the invention to provide a rechargeable electric power supply device which is rechargeable to a significant level by application of a low potential within a very short time of about several seconds and has a very great electric capacitance.

It is a further object of the invention to provide a rechargeable electric power supply device which is able to discharge a required quantity of electricity with little residual charges being reduced over a relatively long time.

Broadly, the above objects can be achieved, according to the present invention, by a rechargeable electric power supply device which comprises a supply unit including a pair of electrodes spaced apart from each other and a mixture of (a) fired fine pellets of an electron absorbing material, i.e. $Nb_3Sn$ and $V_3Ge$ as superconducting material, (b) fine particles of a mixed electron absorbing material comprising $V_3Ga$, Bi, CuO, Sr and $FeO_2$, (c) fine particles of a catalyst, (d) fine particles of C and $FeO_2$ serving as a stabilizer, and (e) a plasticizer, and a casing for accommodating the pair of electrodes and the mixture therein so that the pair of electrodes are individually in intimate contact with the mixture.

PREFERRED EMBODIMENT OF THE INVENTION

Figure 1:
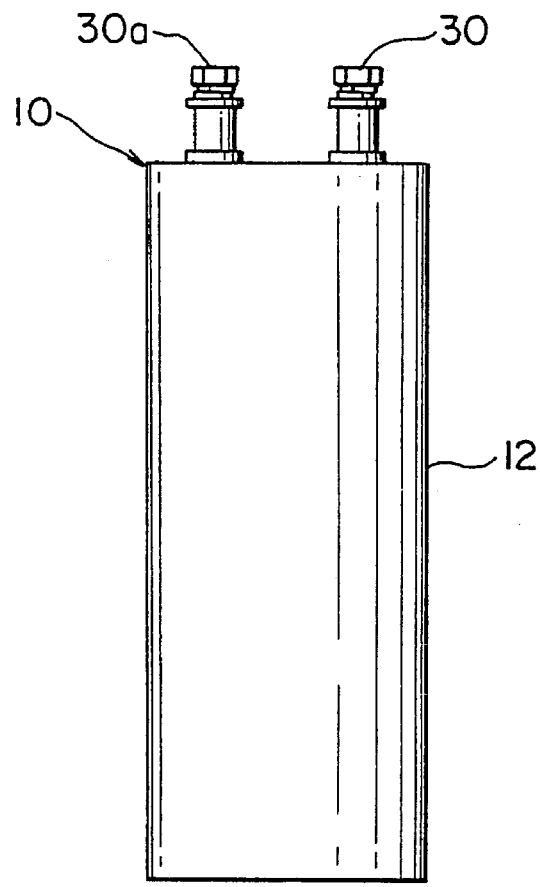
FIG. 1 is a front view of a rechargeable electric power supply device according to an embodiment of the invention.
Figure 2:
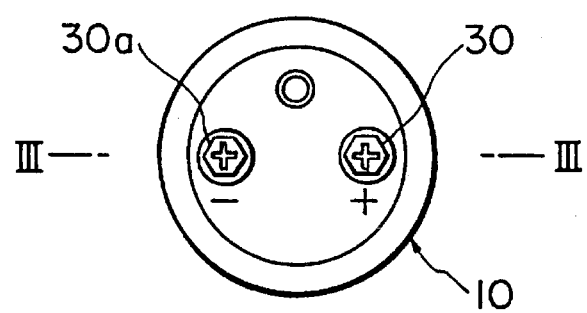
FIG. 2 is a plan view of the device of FIG. 1.
Figure 3:
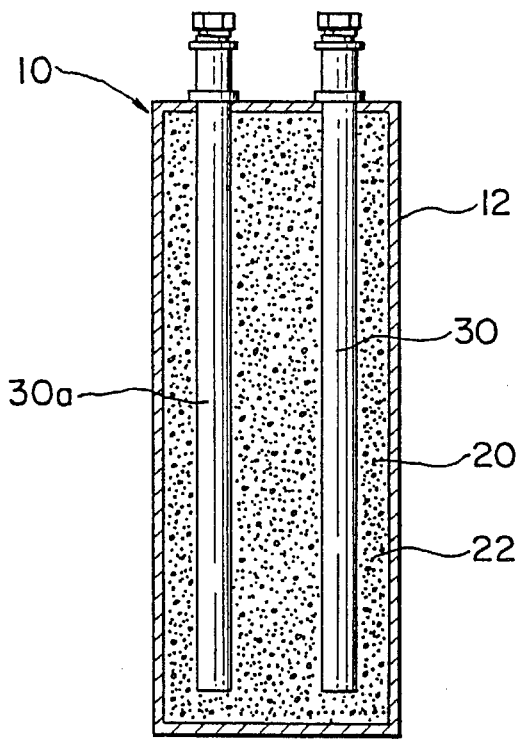
FIG. 3 is a longitudinal sectional view taken along the line III—III of FIG. 2.

Reference is now made to the accompanying drawings and particularly, to FIGS. 1 to 3 wherein like reference numerals, respectively, indicate like members or parts.

In FIGS. 1 to 3, there is shown a rechargeable electric power supply device 10 which includes a pair of positive and negative electrodes 30, 30a which are spaced apart from each other and are surrounded with a mixture of fired pellets 20 and fine particles 22 of a mixed electron absorbing material comprising $V_3Ga$, Bi, CuO, Sr and $FeO_2$, a catalyst, and C and $FeO_2$ along with a plasticizer. The pair of electrodes 30, 30a are arranged parallel to each other as shown in FIG. 3. Indicated at 12 is a casing hermetically accommodating the pair of the electrodes 30, 30a and the mixture of the fired pellets 20 and the fine particles 22 in such a way that the electrodes 30, 30a are in intimate contact with the mixture.

The paired positive and negative electrodes 30, 30a are made of carbon. These electrodes are arranged to be electrically insulated at the portions where contacted with the casing 12.

The electrodes 30, 30a should be spaced apart from each other in order to prevent electric contact therebetween. The positive electrode 30 is coated with fine particles of Ge compounds on the surface thereof to an extent where the electrode is accommodated in the casing 12. Likewise, the negative electrode 30a is coated with fine particles of bismuth compounds. By the formation of the coatings, the charge characteristics are improved to an extent.

The pellets of (a) are electron absorbing in nature and are made of compounds of $Nb_3Sn$ and $V_3Ge$. The compounds of these elements should be of the superconductor grade, meaning that when placed under conditions sufficient for superconductivity, they exhibit superconductivity.

The pellets may take any form such as spheres, spheroids, cylinders or the like and have a size of not larger than 1.5 mm in a major length.

The fine particles of (b) should exhibit electron absorbing ability as well as the pellets (a) set out above. The fine particles consists of $V_3Ga$, Bi, CuO, Sr and $FeO_2$.

The ingredient (c) is a catalyst which is used in the form of fine particles and having a size of not larger than 0.03 μm. The catalyst is made of Ca.

The ingredient (d) is composed of C and $FeO_2$ which are respectively, used as a stabilizer necessary for storing electron in the rechargeable electric power supply device in the form of fine particles whose size is in such a range as defined hereinbefore with respect to the ingredients (b) and (c).

Finally, the ingredient (e) is added to the ingredients (a) to (d) as a kind of plasticizer which contributes to intimate contact of the ingredients (a) to (d) therewith. The plasticizer includes dioctyl salicylphthalate and sodium borate. These compounds are used in combination.

The ingredients (a) to (e) are, respectively, provided in predetermined amounts and mixed uniformly to provide a mixture to be filled in the casing.

The present invention is more particularly described by way of example.

EXAMPLE

In this example, fabrication of a rechargeable electric power supply device of the type as shown in FIGS. 1 to 3 is described.

$Nb_3Sn$ serving as an electron absorbing material and $V_3Ge$ serving also as an electron absorbing material were provided uniformly mixed, followed by firing under conditions to obtain pellets 20 with a size not larger than 1.5 mm.

An electrode unit having a pair of a positive carbon electrode 30 and a negative carbon electrode 30a was placed in position to obtain an electric power supply device 10. It will be noted herein that the positive carbon electrode 30 was coated with fine particles of a germanium compound thereon and the negative carbon electrode 30a was coated with fine particles of a bismuth compound thereon.

Figure 4:
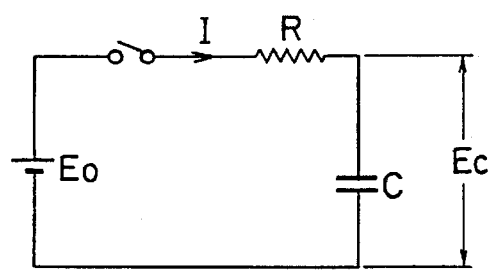
FIG. 4 shows a constant voltage charge circuit using the device of the invention.
Figure 6:
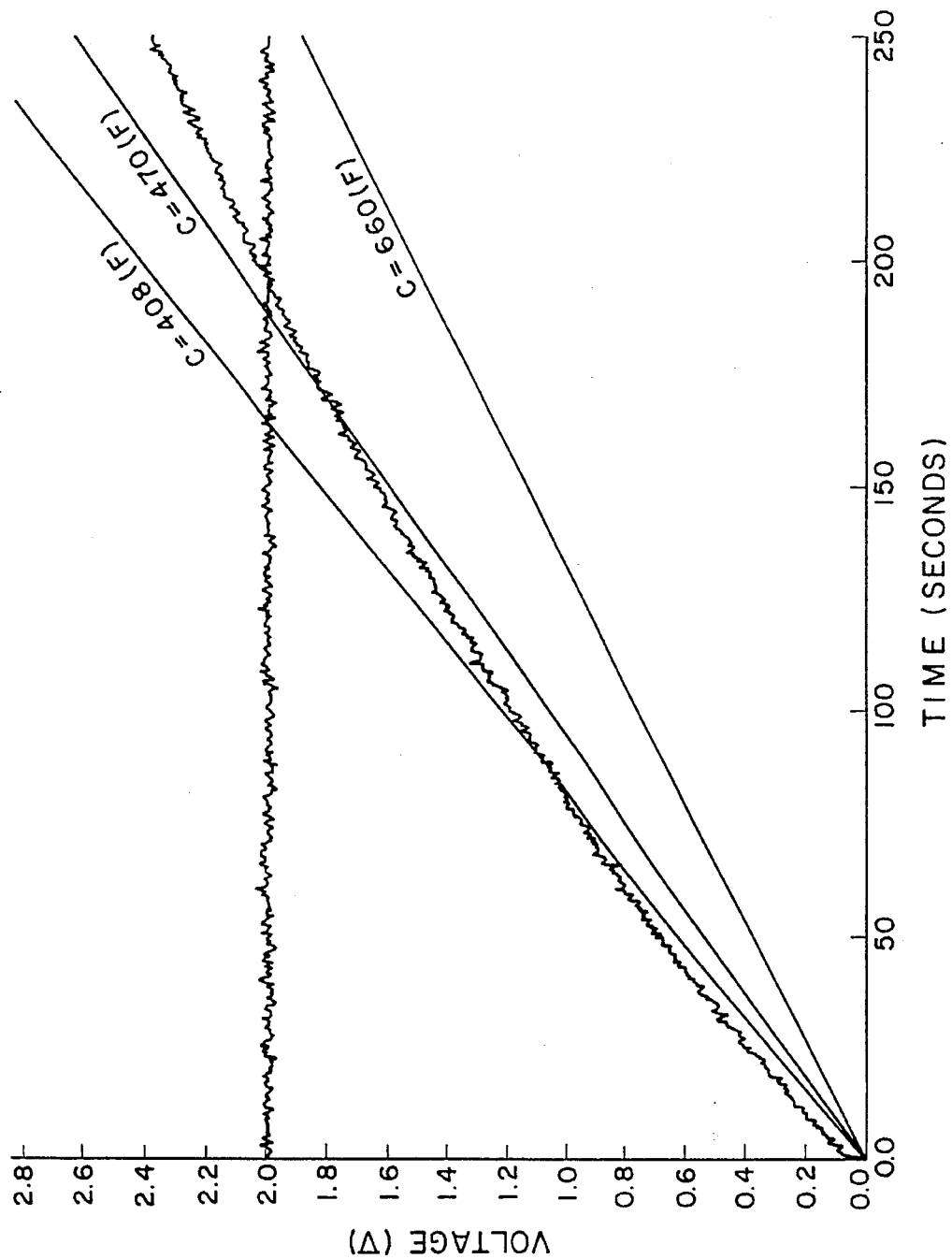
FIG. 6 is a graphical representation of a constant voltage charge characteristic by voltage in relation to the variation in time (seconds)

FIG. 4 shows a constant voltage charging circuit using the device of the invention. The above-fabricated power supply system was subjected to measurement of constant voltage charge characteristic by use of the circuit of FIG. 4 wherein Io was 5A and R=2.034 ohms. The results are shown in FIG. 6 in which the ordinate indicates a voltage and the abscissa indicates a charging time for different electric capacitances of 408 F., 470 F. and 660 F. From the figure, it will be seen that electric capacitances linearly increase in proportion to the voltage applied.

From the above results, the following equation can be obtained.

$$Ec = \frac{1}{C} \int I dt, \text{ thus } Ec = \frac{1}{C} It$$

wherein Ec [V] represents a capacitor voltage and C[F] represents an electric capacitance.

Figure 5:
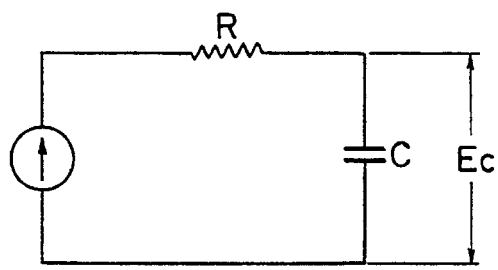
FIG. 5 shows a constant current charge circuit using the device of the invention.
Figure 7:
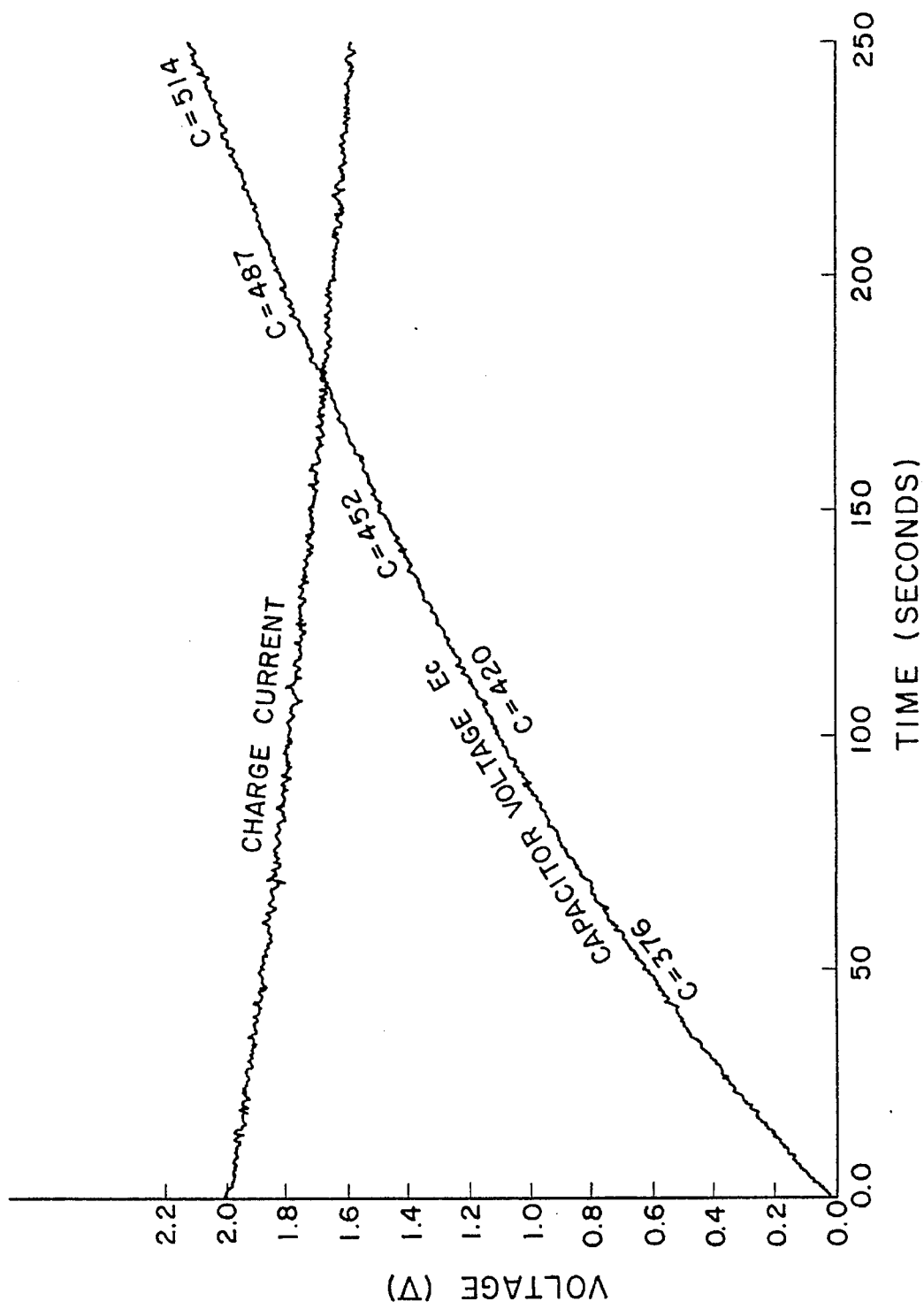
FIG. 7 is a graphical representation of a constant current charge characteristic by voltage in relation to the variation in time (second).

FIG. 5 shows a constant current charging circuit using the device of the invention wherein Eo=10 A and R=2.034 ohms. In this figure, the ordinate indicates a voltage and the abscissa indicates a time by seconds. The results are shown in FIG. 7, revealing that the capacitor potential increases linearly but the charge current slightly decreases as time passes.

From the results, the following equations are obtained $$T = CR, \ E_c = E_0 \left( 1 - \xi \frac{-\tau}{T} \right)$$

$$T = \frac{0.43429}{\log_{10} \frac{E_0}{E_0 - E_c}} \times t$$

$$t = \frac{T}{0.43429} \log_{10} \frac{E_0}{E_0 - E_c}$$

As will be apparent from the above example, the device of the invention exhibits a remarkable increase of the charge power with the capability of emitting electrons over a prolonged time.

Moreover, when the twenty eight pieces (each 14 devices connected in series were connected in parallel) of the rechargeable electric power supply device were charged for 30 seconds, a brush motor with an output power of 130 W/24V could be rotated under condition of no load for 14 minutes. Under load, the motor could be rotated over 5 minutes.

As stated above, the power supply device or devices of the invention can be charged with a large quantity of current at low voltage within several seconds. In addition, the electric capacitance is very great. It has been confirmed that on discharge under load, a required amount of current is discharged while residual charges are scarcely reduced.

Where the device of the invention is applied to solar modules in combination with known lead batteries or the like, it exhibits both good constant current charge characteristic and constant voltage charge characteristic, so that the solar modules can be worked satisfactorily. The device of the invention ensures remarkably charge efficiency and utilization efficiency is advantageous in the great electric capacitance and also in its function like capacitor.

The device of the invention has further advantages in that the charge time is very short and when charge and discharge cycles are repeated, the solar modules suffer little or no damage thereon with their life being prolonged. Thus, the device is good in structural arrangement and economy.

What is claimed is:

1. A rechargeable electric power supply device which comprises a supply unit including a pair of electrodes spaced apart from each other and a mixture of (a) fired fine pellets of an electron absorbing material, (b) fine particles of a mixed electron absorbing material comprising $V_3Ga$, Bi, CuO, Sr and $FeO_2$, (c) fine particles of a catalyst, (d) fine particles of C and $FeO_2$, and (e) a plasticizer, and a casing for accommodating the pair of electrodes and the mixture therein so that the pair of electrodes are individually in intimate contact with the mixture.

2. The device according to claim 1, wherein said pellets consist of $Nb_3Sn$ and $V_3Ge$ as superconducting material.

3. The device according to claim 1, wherein said fine pellets individually have a size of not larger than 1.5 mm.

4. The device according to claim 1, wherein said fine particles (b) consist of $V_3Ga$, Bi, CuO, Sr and $FeO_2$ and have a size of not larger than 0.03 μm.

5. The device according to claim 1, wherein said fine particles (c) consist of Ca and have a size of not larger than 0.03 μm.

6. The device according to claim 1, wherein said fine particles (d) consist of C and $FeO_2$ and have a size of not larger than 0.03 μm.

7. The device according to claim 1, wherein said plasticizer consists of dioctyl salicylphthalate and sodium borate.

8. The device according to claim 1, wherein said pair of electrodes are each made of carbon, positive of which is coated with fine particles of a germanium compound thereon while negative of which is coated with fine particles of a bismuth compound.

* * * * *